July 21, 1936.  H. WAGNER  2,048,088
BACKWATER VALVE TO BE USED ON SEWERS, DRAINS AND THE LIKE
Filed Jan. 16, 1935
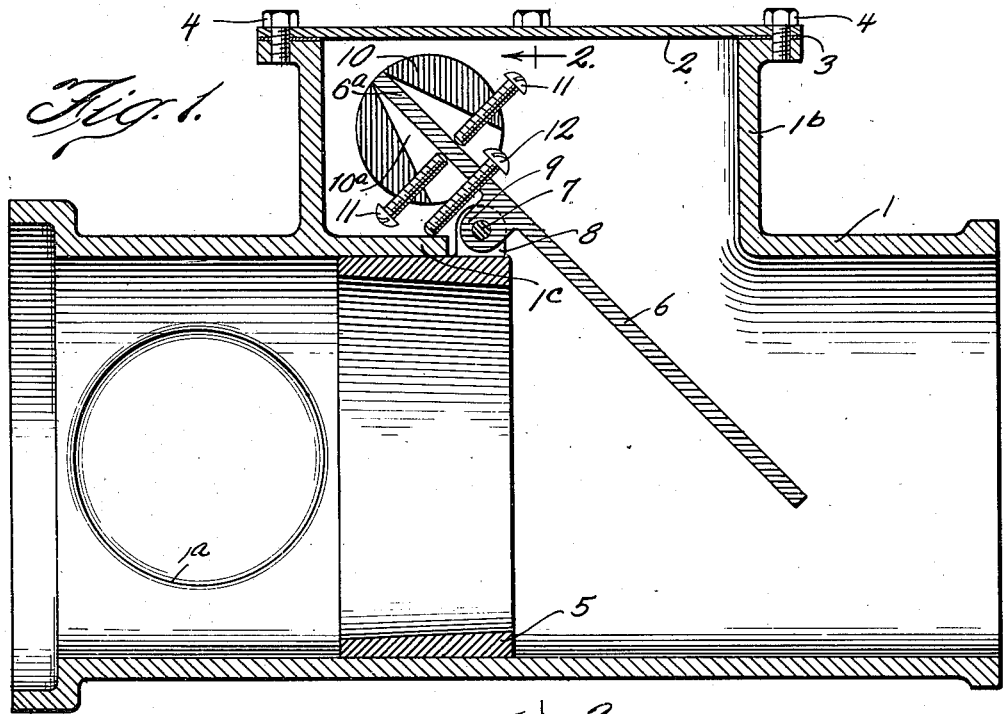
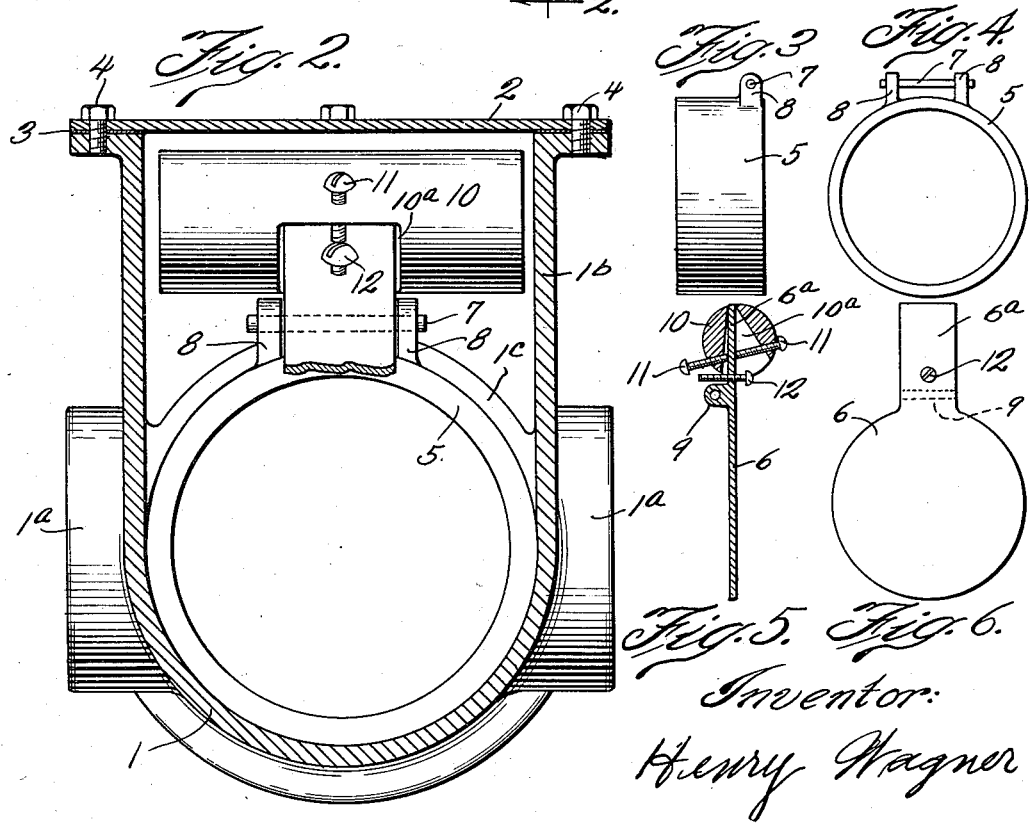
Inventor:
Henry Wagner Patented July 21, 1936

2,048,088

UNITED STATES PATENT OFFICE 2,048,088

BACKWATER VALVE TO BE USED ON SEWERS, DRAINS, AND THE LIKE

Henry Wagner, Chicago, Ill.

Application January 16, 1935, Serial No. 2,024

6 Claims. (Cl. 251—126)

This invention relates to an improved valve particularly adapted for use in a sewer and one object of the invention is to provide a valve which when in place in a sewer pipe will serve very effectively as a back water valve and prevent water from backing up in a sewer pipe and flooding a cellar, areaway, or other place with which the sewer pipe communicates.

Another object of the invention is to provide the valve with an improved type of gate so constructed and mounted that opening and closing of the gate by water pressure in the sewer pipe may be controlled, the gate carrying a weight which is adjustably mounted upon the gate and may be set to prevent complete closing of the gate and thus eliminate likelihood of material catching between the gate and the cooperating valve seat. By this arrangement, the valve seat will be free of obstructions and complete closing of the valve gate will not be interfered with during closing of the gate by back pressure in a sewer pipe.

Another object of the invention is to so construct the valve body and so mount the gate and its cooperating seat that when repairs or adjustments are necessary, easy access may be had to the gate and the gate and its seat entirely removed from the cylindrical body of the valve and then easily replaced after adjustments or repairs have been made.

The invention is illustrated in the accompanying drawing, wherein

Figure 1 is a longitudinal sectional view through the improved valve.

Figure 2 is a sectional view taken transversely through the valve along the line 2—2 of Figure 1.

Figure 3 is a side elevation of the valve seat.

Figure 4 is a view in elevation looking at the inner or forward end of the valve seat.

Figure 5 is a sectional view taken vertically through the gate and its weight.

Figure 6 is a view in elevation of the gate with its weight removed.

The body or casing 1 of the improved valve is substantially cylindrical in shape and has a construction similar to that of a pipe section. It will thus be seen that the valve body may be mounted in a pipe line with its front and rear end portions coupled to pipe sections in a well-known manner. Side arms 1$^a$ extend from opposite sides of the cylindrical body adjacent the forward end thereof in order that branch pipes forming part of a sewer system of a house or other building may be coupled to the valve and water enter the valve body from opposite sides thereof adjacent its forward end as well as through the forward end of the body. Intermediate its length the body carries an upstanding neck 1$^b$ which is formed integral with the valve body and has its open lower end communicating with the body, and by referring to Figures 1 and 2 it will be seen that a bridge extends transversely of the valve body under the forward portion of the neck and, together with adjoining portions of walls of the valve body, provides a sleeve 1$^c$ having an internal diameter corresponding to the diameter of the valve body. The upper end of the neck is normally closed by a cover 22 consisting of a metal disc which rests upon the outwardly flanged upper end of the neck and is firmly but detachably secured by screws 4. A gasket 3 is provided between the flanged end of the neck and marginal portions of the cover so that when the screws are tightened, a tight joint will be provided between the cover and neck and danger of leakage between the neck and cover eliminated. In view of the fact that the cover is removable, it may be easily taken off when repairs or adjustments are necessary and access had to mechanism within the neck and the body portion of casing 1 under the neck.

The mechanism within the neck and the portion of the casing under the neck consists, briefly, of a tubular seat 5 which fits snugly into the sleeve 1$^c$ and carries a gate 6 pivoted to the valve seat and carrying a weight which is adjustably mounted in order that closing movement of the gate may be controlled. The gate is formed of strong rust-proof metal and at its upper end carries a shank 6$^a$ in the form of a rectangular tongue extending radially from the circular body portion of the gate, as shown in Figure 6. A bearing sleeve 9, which may be referred to as a hinge ear, projects from the forward face of the shank at approximately the junction of the lower end of the shank with the gate and this sleeve or hinge ear fits between hinge ears 8 where it is mounted by a pivot pin 7 carried by the hinge ears 8 and extending between the same, as shown in Figure 4. Attention is called to the fact that due to this construction, the pivotal mounting for the gate will be above the portion of the valve seat which projects from the sleeve 1$^c$ rearwardly of the valve body or casing and in offset relation to the gate. It will thus be seen that the gate will be pivotally mounted by an offset hinge ear and may have swinging movement from a vertical position in which it will be disposed in contacting engagement with the inner or rear end of the seat 5, which is its closed position, to a tilted or open position. Movement of the gate in an opening direction is limited by a screw 12 which is threaded through the shank or tongue 6ª and by contact with the sleeve 1ᶜ will prevent the gate from moving in an opening direction beyond a desired position. By adjusting the screw, the extent to which the gate is allowed to open may be controlled.

The gate is to be balanced in order that it will be normally held in a partially opened position and in order to do so there has been provided a weight 10 consisting of a metal bar which is preferably circular in cross section and of a length slightly less than the diameter of the neck 1ᵇ, as shown in Figure 2. Midway its length the weight is formed with a pocket 10ª which tapers upwardly from the under portion of the weight, as shown in Figure 1, and at its upper end terminates in a slot of such dimensions that while the shank 6ª may extend to the upper end of the pocket it will be prevented from passing outwardly through the slot. Therefore, the weight will be disposed in straddling relation to the shank of the gate and will be mounted for tilting movement thereon from a position such as shown in Figure 1 to an adjusted position such as shown in Figure 5. Adjusting screws 11 are threaded through the weight midway the length thereof and are disposed in opposed relation to each other so that their inner ends will bear against front and rear faces of the shank with the screws in alinement with each other. By loosening one screw and tightening the other, the weight may be tilted upon the shank and moved from a position in which its weight is approximately evenly distributed at front and rear sides of the shank to a position in which its center of gravity will be shifted forwardly of the gate, as shown in Figure 5, or rearwardly of the gate. It will thus be seen that the action of the weight may be controlled and its weight so distributed that under normal conditions the gate will remain at an angle in which it will be opened to quite an extent or closer or farther away from the tubular seat 5. The fact that the normal position of the gate may be regulated and the gate prevented from normally moving to a fully closed position is an important feature of the invention as the gate will be normally held in an open position and material will be prevented from catching between the gate and the tubular seat as it passes through the tubular seat toward the rear end of the valve body or casing. It will thus be seen that the tubular seat will at all times be clear of obstructions and when back pressure in the sewer pipe causes the gate to be swung toward a closed position, it may fit tight against the end of the tubular seat and form a tight closure which will effectively prevent water from backing through the sewer pipe and outwardly through a drain in a cellar or areaway. If it is found that adjustments or repairs are necessary, the screws 4 can be loosened in order to remove the cover 2 and adjustments made or, if necessary, the tubular seat may be withdrawn from the sleeve 1ᶜ with the gate drawn upwardly out of the valve casing through the neck. Repairs may then be made and the gate and seat passed downwardly through the neck into the cylindrical casing and the seat moved into its proper position within the sleeve. The cover may then again be set in place and secured.

Having thus described the invention, what is claimed as new is:

1. A sewer valve comprising a body having a neck rising from intermediate its length, a seat being provided in the body under said neck, a gate having an upstanding shank provided with hinge ears overlying said seat and pivotally connected therewith to mount the gate for swinging movement into and out of a shut position against the seat, an abutment screw threaded through the shank for limiting opening movement of the gate, a weight carried by said shank above the pivotal mounting thereof and tiltable transversely of the shank to shift the center of gravity thereof, and set screws carried by said weight and engaging opposite faces of the shank for adjusting the position of the weight and holding the weight in an adjusted position.

2. A sewer valve comprising a body, a neck rising from said body, a valve seat in said body under said neck, a gate for closing against said seat disposed vertically in said body and provided with an upstanding shank extending into the neck and having offset ears pivotally mounted above the seat, and a weight for controlling movement of the gate in a closing direction loosely carried by the shank and held against movement longitudinally upon the shank but movable thereon so as to shift its center of gravity transversely thereof into position to yieldably hold the gate open a predetermined extent.

3. A sewer valve comprising a body, a neck rising from said body, a valve seat in said body under said neck, a gate for closing against said seat disposed vertically in said body and provided with an upstanding shank extending into the neck and having offset ears pivotally mounted above the seat, and a weight for controlling movement of the gate in a closing direction straddling the upper end of the shank and carrying adjustable members for engaging opposed faces of the shank and moving the weight to an adjusted position so as to shift its center of gravity transversely of the shank for normally holding the gate open a predetermined extent.

4. A sewer valve comprising a body, a neck rising from said body, a valve seat in said body under said neck, a gate for closing against said seat disposed vertically in said body and provided with an upstanding shank extending into the neck and having offset ears pivotally mounted above the seat, a weight for controlling movement of said gate extending transversely of said shank and formed intermediate its length with an upwardly tapered pocket receiving the upper end portion of the shank to tiltably mount the weight upon the shank, and set screws threaded through openings formed in the weight with their inner ends abutting opposed faces of the shank and holding the weight in an adjusted position with the gate opened a predetermined extent.

5. A sewer valve comprising a body, a neck rising from said body intermediate ends thereof, a removable cover for said neck, a collar in said body under a portion of the neck, a tubular seat fitting snugly in said collar and projecting from the inner end thereof under the neck, a gate disposed vertically for closing engagement with the seat and having an upstanding shank extending into the neck above the collar and seat, a hinge ear rising from the inner end portion of said seat in front of said collar, ears projecting rearwardly from the shank at opposite ends of the ear carried by the seat, a pin passing through said ears to pivotally mount the gate for swinging movement into and out of a closed position against the seat, a weight formed intermediate its length with a pocket leading from the under portion of the weight and tapered upwardly to receive the upper portion of the shank and tiltably mount the weight thereon, set screws threaded through the weight and engaging front and rear faces of the shank to secure the weight in adjusted positions upon the shank, and an abutment screw threaded through the shank under the weight for engaging said collar and limiting closing movement of the gate.

6. A sewer valve comprising a body, a neck rising from said body, a valve seat in said body under said neck, a gate for closing against said seat disposed vertically and having a shank projecting into said neck, the gate being pivotally mounted in a plane out of the plane of the contacting faces of the seat and gate to mount the gate for swinging movement into and out of a closed position, a weight extending transversely of the shank and formed with an upwardly tapered pocket receiving the upper end portion of the shank to tiltably mount the weight, and set screws threaded through the weight and abutting opposed faces of the shank to tilt the weight and secure the weight in an adjusted position to normally hold the gate open a predetermined extent.

HENRY WAGNER.